United States Patent Office 2,732,649
Patented Jan. 31, 1956

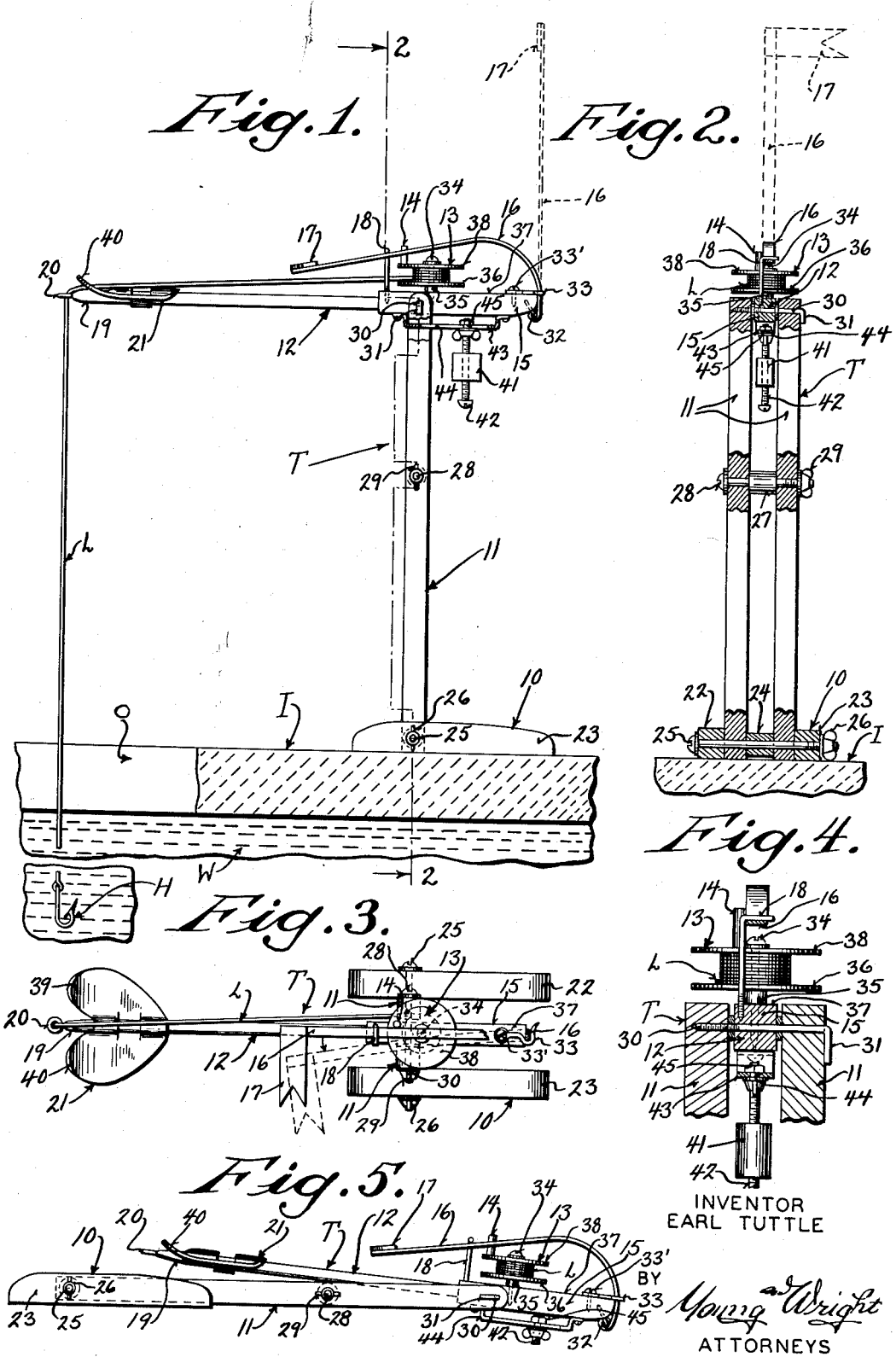

2,732,649
ICE FISHING RIG
Earl Tuttle, Fond du Lac, Wis.

Application June 4, 1952, Serial No. 291,627

1 Claim. (Cl. 43—17)

This invention appertains to fishing rigs and more particularly to a rig device designed for ice fishing.

A primary object of my invention is to provide an ice fishing rig which may be readily collapsed to a compact inoperative position for transporting from place to place and when desired may be easily set up on the ice to its extended operative position.

Another object of my invention is to provide a fishing rig which is set up adjacent a hole in the ice and includes a base upon which is pivoted a short rod carrying a reel and line with means responsive to the outward movement of the line for releasing a signal flag when a fish has been hooked.

Still another object of my invention is to provide novel means whereby the rod can be steadied in the wind.

A further object of my invention is to provide a novel sliding and adjustable weight for further balancing the rod when in its operative position.

A more specific object of my invention is to provide a leaf spring signaling member secured at one end of the rod and which is normally flexed down over the rod and retained under a keeper hook; the reel carrying an upright crank pin which will move against the leaf spring to release the same from the keeper hook when a pull is exerted on the line, whereby, the leaf spring signaling member will assume a vertical upright position indicating that a fish has been caught.

A still further object of my invention is to provide a simple, practical and reliable construction that is economical to manufacture, easy to assemble and positive in its operation.

With the above and other objects in view, which will more readily appear as the nature of the invention is better understood, the same consists in the novel construction, combination and arrangement of parts hereinafter more fully described, illustrated and claimed.

A preferred and practical embodiment of my invention is shown in the accompanying drawings. In which drawings:

Figure 1 is a side elevational view of my fishing rig shown in position on the ice with the hook and line extending into the water through a hole made in the ice and illustrating by dotted lines the released position of the signal member;

Figure 2 is a vertical sectional view of my device taken on the line 2—2 of Figure 1 looking in the direction of the arrows and again showing in full and dotted lines, the two respective positions of my signal member;

Figure 3 is a top plan view of my fishing rig illustrating in particular the direction of rotation of the reel and the resultant movement of the signal flag to its dotted line position where it will be released from the keeper hook;

Figure 4 is an enlarged fragmentary vertical sectional view of my rig similar to that illustrated in Figure 2 of the drawings but showing only the upper portion thereof; and Figure 5 is a side elevational view of my fishing rig shown in its collapsed inoperative position.

Referring to the drawings in detail, wherein similar reference characters designate corresponding parts throughout the several views, the letter T generally indicates one type of my improved rig and in Figures 1 and 2 of the drawings the same is shown in position on the ice I with the fishing line L extending through the hole O made in the ice. The line L has secured to the outer end thereof, the hook H which extends into the water W to the desired depth.

The rig T includes broadly a base 10 to which is pivotedly secured parallel standards 11. The standards 11, in turn, pivotedly support adjacent the upper ends thereof, a short fishing rod 12. Mounted upon the rod 12 for rotation about a vertical axis is a reel 13 which carries an upstanding crank pin 14 and the same forms an important part of my invention. Secured to the rear end 15 of the rod 12 is a leaf spring signaling member 16 which carries a red or otherwise colored signaling flag 17 on its free end. The spring signaling member 16 is normally flexed down over the rod 12 and is placed under a keeper hook 18 which is, in turn, carried by the rod at a point adjacent and forward of the reel 13. The line L extends from the reel 13 forwardly and over the tip 19 of the rod 12 through an eye 20. The outer end 19 of the rod also carries a bendable fin 21, the purpose of which will be readily apparent as the description proceeds.

More specifically, the base 10 includes two parallel and horizontally extending supporting legs 22 and 23 between which is pivotedly supported the two parallel upright standards 11. The upright standards 11 are spaced at their lower ends by means of a spacer block 24 through which extends the pivot bolt 25. The pivot bolt 25 extends entirely through the legs 22 and 23 of the base 10, the upright standards 11 and the spacer block 24 and the outer end of the pivot bolt carries a wing nut 26 which may be tightened to hold the upright standards 11 in any desired position in relation to the base 10.

To further strengthen the upright standards 11 and also to form a stop for the rod 12 in its collapsed position, I provide an intermediate spacer block 27 which is similar to the lower spacer block 24. A bolt 28 also carrying a wing nut 29 extends through the standards 11 and block 27 to hold the same in position.

The short rod 12 is pivoted adjacent its thickened rear end portion 15 between the upper ends of the upright standards 11 by means of a pivot pin 30 which extends through one of the upright standards 11 through the end 15 of the rod 12 and is threadedly received in the other upright standard. The outer end of the pivot pin 30 is bent angularly to provide a handle or finger piece 31 which may be readily turned to adjust or remove the rod from its support.

One end of the leaf spring signaling member 16 is pivotally received in an eye 32 which, in turn, is secured adjacent the rear end 15 of the rod 12 and is held in its position by means of a hook 33 which is pivotedly received under the head of a screw 33′ and which extends over a portion of the leaf spring so as to keep the same from falling backward or hanging down from its pivot.

One of the salient features of my invention resides in the position of the fishing reel 13 on the rod 12, and as shown, the reel lies in a horizontal position and rotates about a vertical axis. The reel 13 is rotatably held above the top portion 15 of the rod 12 by means of a vertically extending pivot bolt 34 which is firmly embedded in the end 15 as shown. The reel is spaced from the top surface of the rod 12 by a small washer 35 which is imposed between the under surface 36 of the reel and the top surface 37 of the rod. The top surface 38 of the reel, near the outer periphery thereof, carries the upstanding crank pin 14 as previously stated. The keeper hook 18 is also firmly embedded in the portion 15 of the rod 12 and it is to be particularly noted that the open end of the hook 18 lies in the direction of rotation of the reel 13.

In fishing through the ice the device is set up as illustrated in Figures 1, 2, and 3 of the drawings and there is usually plenty of open space for the wind to get a good sweep and very often the wind causes an undesirable up and down movement of the rod 12. To cushion this effect I provide the bendable fin 21 which is slipped over the outer end 19 of the rod 12. The fin 21 is heart shaped to provide vanes 39 and 40 extending forwardly on either side of the rod and these vanes may be bent in various ways to counteract the wind pressure. The fin 21 is also rotatably mounted on the rod so that the same may readily be turned to a vertical plane or any intended position. To further compensate for the wind pressure and also to provide a means for balancing the rod, I provide an adjustable weight 41 which is slidably mounted adjacent the rear end of the rod 12 on the portion 15. The weight 41 may be adjusted vertically on the threaded bolt 42 and may be also moved longitudinally or backward and forward on the rod by being slidably mounted on the rack 43 which is provided with a slot 44 through which the upper end of the threaded bolt 42 extends and is suspended by means of the nut 45.

Referring now in particular to Figure 5 of the drawings, it is noted that the rig T may be easily collapsed to form a small, compact device which may be readily carried and transported from place to place. In order to collapse my rig it is merely necessary to loosen the wing nut 26 of the base 10 and fold or pivot the upright standards rearwardly so that the same are received between the two parallel legs 22 and 23 of the base as shown. The rod portion 12 is then pivoted forwardly in the position shown and the device may then be readily transported from place to place. If desired, I may remove the pivot pin 30 by turning the finger piece 31 and the rod 12 is then loosened and may be separately carried or moved downwardly between the standards.

In use, the standards 11 are pivoted to their vertical upright position with the rod 12 pivotally secured to the upper ends thereof. The rod is then balanced by manipulating the weight 41 and the line L is payed out through the hole in the ice I to the desired depth in the water W. The resilient signal member 16 is then brought forward and placed under the keeper hook 18 with the crank pin 14 resting against the leaf spring as better shown in Figure 3 of the drawings. When the fish takes the hook and exerts a pull on the line the reel will be rotated in the direction of the arrow and the spring signal member 16 will be moved in the direction of the arrow (Figure 3) by the rotation of the crank pin 14 to its dotted line position. In this position the signal member is freed from its keeper hook 18 and will spring up to a vertical position as illustrated by the dotted lines in Figures 1 and 2 of the drawings and this indicates that a fish has been caught. The crank pin 14 is then grasped in the hand and the reel rotated in the opposite direction and the fish drawn in. As previously stated, if a wind is encountered the bendable fin 21 is adjusted so that the rod may be steadied.

From the foregoing it is believed that the features and advantages of the invention will be readily apparent to those skilled in the art and it will, of course, be understood that changes in the form, proportions and minor details of construction may be resorted to without departing from the spirit of the invention or the scope of the appended claim.

I claim:

A balancing device for a fishing rig of the type having an operative position and a collapsible position, a base portion, a pair of parallel upright standards pivotably secured to the base, a fishing rod pivotably secured between the parallel standards adjacent the upper ends thereof, a fishing reel connected to the rod having a fishing line wound thereabouts and a resilient signal responsive to the paying out of the line, comprising, a rack secured to the under portion of said fishing rod adjacent the rear end thereof and extending longitudinally therewith, said rack being longitudinally slotted, a threaded bolt received in said slot and depending from said rack, a wing nut on said bolt adjacent the undersurface of said rack for slidably and adjustably mounting one end of said bolt to said rack, and a weight threadably received on said bolt, whereby a longitudinal and vertical adjustment of said weight for balancing the rod is obtained.

References Cited in the file of this patent

UNITED STATES PATENTS

| | | |
|---|---|---|
| 279,508 | Tiffany | June 12, 1883 |
| 518,013 | Thayer | Apr. 10, 1894 |
| 892,528 | Kricke | July 7, 1908 |
| 1,792,989 | LaGue | Feb. 17, 1931 |
| 2,114,529 | Goodhue | Apr. 19, 1938 |
| 2,618,091 | Sheraski | Nov. 18, 1952 |
| 2,624,972 | Burg | Jan. 13, 1953 |
| 2,663,962 | King | Dec. 29, 1953 |